US009956883B2

(12) United States Patent
Kawabata

(10) Patent No.: US 9,956,883 B2
(45) Date of Patent: May 1, 2018

(54) STRADDLE ELECTRIC VEHICLE

(75) Inventor: Hiroki Kawabata, Kakogawa (JP)

(73) Assignee: KAWASAKI JUKOGYO KABUSHIKI KAISHA, Kobe-shi, Hyogo (JP)

( * ) Notice: Subject to any disclaimer, the term of this patent is extended or adjusted under 35 U.S.C. 154(b) by 743 days.

(21) Appl. No.: 14/369,179

(22) PCT Filed: Dec. 28, 2011

(86) PCT No.: PCT/JP2011/007332
§ 371 (c)(1),
(2), (4) Date: Jul. 11, 2014

(87) PCT Pub. No.: WO2013/098891
PCT Pub. Date: Jul. 4, 2013

(65) Prior Publication Data

US 2015/0291046 A1 Oct. 15, 2015

(51) Int. Cl.
*B62D 11/00* (2006.01)
*B60L 11/18* (2006.01)
(Continued)

(52) U.S. Cl.
CPC ............ *B60L 11/1818* (2013.01); *B60K 1/04* (2013.01); *B60L 11/1803* (2013.01);
(Continued)

(58) Field of Classification Search
CPC .................................................. B60L 11/1818
(Continued)

(56) References Cited

U.S. PATENT DOCUMENTS 5,421,427 A * 6/1995 Ogawa ................ B60L 11/1805 180/220
2004/0238253 A1* 12/2004 Yonehana ................ B60L 7/12 180/219
(Continued)

FOREIGN PATENT DOCUMENTS

DE 102006037251 A1 2/2008
JP 2003267283 A 9/2003
(Continued)

OTHER PUBLICATIONS

ISA Japanese Patent Office, International Search Report of PCT/JP2011/007332, dated Jan. 31, 2012, WIPO, 2 pages.
(Continued)

*Primary Examiner* — Joseph M Rocca
*Assistant Examiner* — Conan D Duda
(74) *Attorney, Agent, or Firm* — Alleman Hall Creasman & Tuttle LLP

(57) ABSTRACT

A straddle electric vehicle comprises a charging connector to which an outside connector connected to an outside electric power supply is detachably attached; a battery which charges therein electric power supplied from the outside electric power supply with the outside connector attached to the charging connector, and discharges the electric power stored therein to supply the electric power to an electric motor; a battery case accommodating the battery; and a seat on which a passenger is seated, wherein the battery case is disposed between the seat and a front wheel, the charging connector is attached to an upper portion of the battery case, and a charging port of the charging connector is located forward relative to the seat so as to face rearward.

9 Claims, 7 Drawing Sheets

(51) Int. Cl.
*B60L 15/20* (2006.01)
*B60K 1/04* (2006.01)
*B62J 1/08* (2006.01)

(52) U.S. Cl.
CPC ........... *B60L 11/1877* (2013.01); *B60L 15/20* (2013.01); *B62J 1/08* (2013.01); *B60K 2001/0405* (2013.01); *B60L 2200/12* (2013.01); *B62K 2204/00* (2013.01); *B62K 2208/00* (2013.01); *Y02T 10/645* (2013.01); *Y02T 10/705* (2013.01); *Y02T 10/7005* (2013.01); *Y02T 10/7072* (2013.01); *Y02T 10/72* (2013.01); *Y02T 10/7275* (2013.01); *Y02T 90/14* (2013.01)

(58) Field of Classification Search
USPC .......................................................... 180/220
See application file for complete search history.

(56) References Cited

U.S. PATENT DOCUMENTS

2006/0001232 A1* 1/2006 Rutkowski ............. B62K 3/005 280/260
2006/0237946 A1* 10/2006 Hutson ...................... B62J 1/28 280/288.4
2008/0072595 A1* 3/2008 Nemeth .................. F02B 21/00 60/605.1
2010/0052287 A1* 3/2010 McFarland ............. B62K 9/00 280/291
2010/0117327 A1* 5/2010 Hadley .................... B62M 6/90 280/214
2010/0228405 A1* 9/2010 Morgal .................... B62H 3/02 701/2
2012/0134102 A1* 5/2012 Sullivan ................ G06F 1/1616 361/679.43
2012/0187881 A1* 7/2012 Tadano ............... B60L 11/1818 318/446
2012/0199409 A1* 8/2012 Nakamura ............... B60K 1/04 180/220
2012/0235639 A1* 9/2012 Hamauzu ............ B60L 11/1818 320/109
2013/0143432 A1* 6/2013 Yamashita .......... B60L 11/1874 439/503
2013/0257374 A1* 10/2013 Ichikawa ............ B60L 11/1809 320/109
2013/0270022 A1* 10/2013 Matsuda ................ B62K 11/04 180/220
2013/0270026 A1* 10/2013 Matsuda .................... B62J 1/18 180/220
2014/0305729 A1* 10/2014 Testoni .................. B62K 11/04 180/220
2014/0319907 A1* 10/2014 Yamazaki ................ B60K 1/04 307/9.1
2014/0339007 A1* 11/2014 Miyashiro .............. B62K 11/10 180/220
2014/0345962 A1* 11/2014 Miyashiro .............. B62K 11/10 180/220
2015/0314692 A1* 11/2015 Inoue ..................... B62K 19/30 318/139
2015/0360576 A1* 12/2015 Nakao ...................... B60K 1/04 180/220
2016/0075400 A1* 3/2016 Ragland ................. B62K 11/04 180/220

FOREIGN PATENT DOCUMENTS

JP 2004210074 A 7/2004
JP 2007015641 A 1/2007
JP 2011068279 A 4/2011
WO 03022671 A2 3/2003

OTHER PUBLICATIONS

European Patent Office, Extended European Search Report Issued in Application No. 11878804.1, dated Oct. 8, 2015, 6 pages.

* cited by examiner 44
62a
61a
49
52
35
45
36
51
43
31c
33
30
51
29c
47
48
29
62a
44
28
42
20

STRADDLE ELECTRIC VEHICLE

TECHNICAL FIELD

The present invention relates to a straddle vehicle such as an ATV (all terrain vehicle) or a motorcycle, and a straddle electric vehicle which drives by a driving power generated by an electric motor.

BACKGROUND ART

In recent years, a straddle electric vehicle which incorporates as a driving power source an electric motor activated by electric power stored in a battery has been developed. The straddle electric vehicle incorporates a charging connector connectable to an outside connector connected to an outside electric power supply, to charge a battery mounted in the vehicle with the electric power supplied from the outside electric power supply (see e.g., Patent Literature 1).

In the electric motorcycle disclosed in Patent Literature 1, the charging connector is accommodated in a member having the same shape as that of a fuel tank, in a location where the fuel tank is disposed in a conventional engine-driven motorcycle. The space inside this member is opened and closed by a cap similar to a lid of the fuel tank.

PATENT LITERATURE

Patent Literature 1: Japanese Laid-Open Patent Application Publication No. 2004-210074

SUMMARY OF INVENTION

Technical Problem

However, in this configuration, when the cap is opened, for example, just after charging, a rider may start the electric motorcycle in a state in which the charging connector is exposed. Since the charging connector is opened upward, water may enter the charging connector from above.

An object of the present invention is to prevent a situation in which a rider starts a straddle electric vehicle in a state in which a charging connector is exposed, or rain water or the like enters a charging port of the charging connector.

Solution to Problem

The present invention has been developed to achieve the above object. According to the present invention, there is provided a straddle electric vehicle which drives by a driving power generated by an electric motor, comprising: a charging connector to which an outside connector connected to an outside electric power supply is detachably attached; a battery which charges therein electric power supplied from the outside electric power supply, with the outside connector attached to the charging connector, and discharges the electric power stored therein to supply the electric power to the electric motor; a battery case accommodating the battery; and a seat on which a passenger is seated, wherein the battery case is disposed between the seat and a front wheel, the charging connector is attached to an upper portion of the battery case, and a charging port of the charging connector is positioned forward relative to the seat so as to face rearward.

In accordance with this configuration, since the charging port faces rearward, it is not necessary to raise the outside connector to a high position. Therefore, a charging operation can be easily carried out, and it becomes possible to prevent ingress of rain water or the like from the outside and from above into the charging port. The charging port faces a rider in a forward or rearward direction, with the rider seated on the seat. For this reason, if the charging port is exposed, the rider can easily see this. This makes it easier to prevent a situation in which the rider starts the electric vehicle with the charging port exposed.

The upper portion of the battery case may have a protruding section, and the charging connector may be accommodated in the protruding section, and the charging port may be provided in a rear side of the protruding section.

In accordance with this configuration, connection of a wire between the charging connector and the battery can be made compact, and the wire can be accommodated in the battery case.

The charging port may be inclined upward, and an eave portion extending rearward may be provided above the charging port.

In accordance with this configuration, since the charging port is oriented not to face perfectly rearward but is inclined slightly upward, the outside connector is easily accessible from above. This allows the outside connector to be easily inserted into the charging port. Therefore, a charging operation can be performed easily. In addition, because of the eave, ingress of rain water into the charging port can be appropriately prevented.

The battery case may have in a rear upper portion a pair of grip members sandwiched by the rider's knees, and the charging port may be positioned forward relative to the grip members.

In accordance with this configuration, the charging port is positioned to be easily seen by the rider straddling the electric vehicle and does not interfere with the rider straddling the electric vehicle, which is an advantage.

The battery case may have in a rear upper portion a pair of right and left grip members sandwiched by the rider's knees, and the charging port may be positioned between the right and left grip members.

In accordance with this configuration, since the charging port is positioned close to the seat and close to a location of the feet of the rider straddling the electric vehicle, the rider is less likely to start the electric vehicle by mistake.

A width of the charging connector may be set greater than a height of the charging connector.

In accordance with this configuration, the charging connector can be reduced in height. Therefore, the charging connector is less likely to interfere with the rider tilted forward during driving.

Advantageous Effects of Invention

As should be appreciated from the above, in accordance with the present invention, it becomes possible to prevent a situation in which a rider starts a straddle electric vehicle in a state in which a charging connector is exposed, or rain water or the like enters a charging port of the charging connector.

DESCRIPTION OF EMBODIMENTS

Hereinafter, embodiments of the present invention will be described with reference to the accompanying drawings. Throughout the drawings, the same or corresponding components are designated by the same reference symbols and will not be described in detail repeatedly. The stated directions are referenced from the perspective of a rider riding in an electric motorcycle which is an exemplary straddle electric vehicle according to the embodiment of the present invention.

Figure 1:
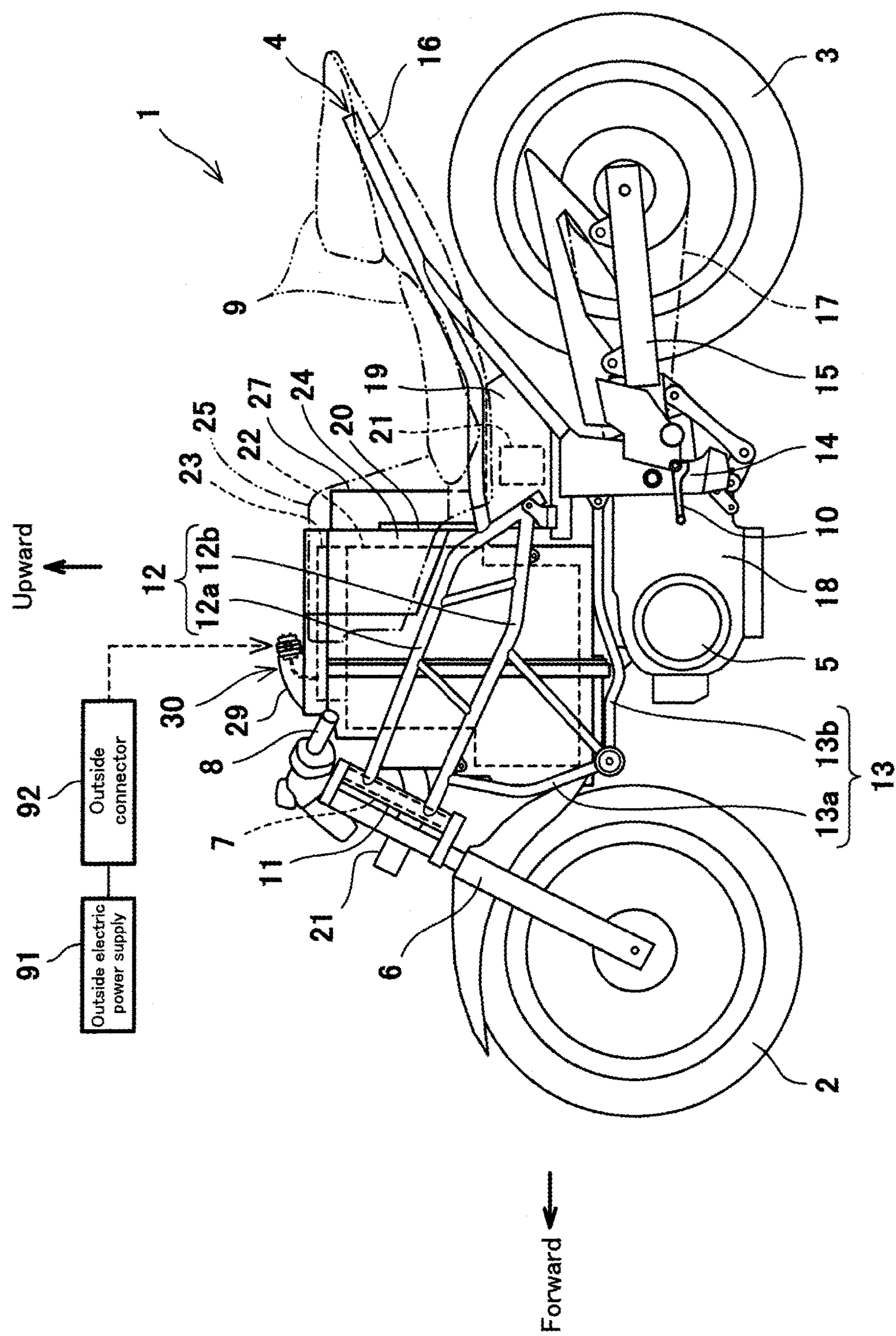
FIG. 1 is a left side view of an electric motorcycle which is an exemplary straddle electric vehicle according to Embodiment 1 of the present invention.

FIG. 1 is a left side view of an electric motorcycle 1 which is an exemplary straddle electric vehicle according to Embodiment 1 of the present invention. As shown in FIG. 1, the electric motorcycle 1 includes a front wheel 2 which is a driven wheel, a rear wheel 3 which is a drive wheel, a vehicle body frame 4 disposed between the front wheel 2 and the rear wheel 3, and an electric motor 5 which is a driving power source for moving the electric motorcycle 1. The electric motorcycle 1 of the present embodiment is not equipped with an internal combustion engine and is configured to rotate the rear wheel 3 by a driving power generated by the electric motor 5.

The front wheel 2 is rotatably mounted to the lower portion of a front fork 6 extending substantially vertically. A steering shaft 7 for steering the front wheel is coupled to the upper portion of the front fork 6, and a bar-type handle 8 is attached to the upper portion of the steering shaft 7. The vehicle body frame 4 includes the head pipe 11, a pair of right and left main frames 12, a pair of right and left down frames 13, and a pair of right and left pivot frames 14.

The steering shaft 7 is rotatably supported by the head pipe 11. Each of the right and left main frames 12 includes an upper frame member **12*a* and a lower frame member 12*b*. The upper frame member 12*a* extends substantially in parallel with the lower frame member 12*b*. The upper frame member 12*a* and the lower frame member 12*b* extend rearward from the head pipe 11 such that they are inclined downward. The upper frame member 12*a* is bent downward at its rear end portion and is connected to the lower frame member 12*b*. Each of the down frames 13 includes a vertical frame member 13*a* extending substantially downward from the perspective of the head pipe 11, and a lower frame member 13*b* extending rearward substantially horizontally from the lower end of the vertical frame member 13*a*. The pivot frames 14 are connected to the rear end portions of the main frames 12 and the rear end portions of the lower frame members 13*b***.

The pivot frames 14 are connected to a swing arm 15 and a seat frame 16. The swing arm 15 extends substantially in a forward or rearward direction and is coupled at its front end portion to the pivot frames 14 such that the swing arm 15 is pivotable and supports the rear wheel 3 at its rear end portion such that the rear wheel 3 is rotatable. The seat frame 16 extends rearward from the rear end portions of the upper frame members **12*a* and the upper end portions of the pivot frames 14 such that the seat frame 16 is inclined upward. A seat 9 on which the rider and a passenger are seated in the forward or rearward direction is mounted to the seat frame 16**.

The electric motorcycle 1 is a straddle vehicle. The rider is seated on the seat 9 while straddling a vehicle body. The lower end portions of the right and left pivot frames 14 are provided with a pair of right and left foot steps 10 (right foot step 10 is not shown in FIG. 1), respectively. The seat 9 is placed rearward relative to the steering shaft 7 and the head pipe 11. The rider straddling the seat 9 and facing forward can stretch hands forward and grip the handle 8. The rider straddling the seat 9 puts the rider's left foot on the left foot step 10 in a location which is leftward relative to the left pivot frame 14, and the rider's right foot on the right foot step 10 in a position which is rightward relative to the right pivot frame 14.

As described above, the driving power source of the electric motorcycle 1 is the electric motor 5. The electric motorcycle 1 includes a motor case 18, an inverter case 19, and a battery case 20. The motor case 18 accommodates the electric motor 5, while the inverter case 19 accommodates an inverter 21. The battery case 20 accommodates a battery 22 and electric components 23 electrically connected to the battery 22. The battery 22 is an electric power supply for the electric motor 5, and is configured to charge electric power supplied from an outside electric power supply and discharges stored DC power to supply DC power to the electric motor. The inverter 21 converts the DC power discharged from the battery 22 into AC power and supplies AC power to the electric motor 5. The electric motor 5 operates by AC power generated by the conversion in the inverter 21 to generate the driving power. The driving power generated by the electric motor 5 is transmitted to the rear wheel 3 via a driving power transmission mechanism 17.

In the present embodiment, the motor case 18 is supported on the down frames 13 and the pivot frames 14 and placed in a region below the down frames 13 and in front of the pivot frames 14. The inverter case 19 is placed in a space of a substantially-inverted-triangle shape when viewed from a side, which is surrounded by the main frame 12, the pivot frame 14 and the seat frame 16, and positioned rearward relative to the lower rear end portion of the battery case 20 and below the front end portion of the seat 9.

The battery case 20 is placed between the seat 9 and the front wheel 2 (or steering shaft 7, handle 8) in the forward or rearward direction. In the present embodiment, the battery case 20 is put on the lower frame members **13*b*, and sandwiched between the right and left main frames 12**.

The upper portion of the battery case 20 protrudes upward from the upper frame members **12*a*. Since the battery case 20 is increased in size in a vertical direction to the greatest possible degree in this way, the capacity of the battery 22 can be increased, which allows the electric motorcycle 1 to drive for a longer time. The battery case 20 includes a seat vicinity portion 24 which faces the seat 9 in the forward or rearward direction. The seat vicinity portion 24 is provided at the rear portion and upper portion of the battery case 20, and positioned above the upper frame members 12*a*. The left side portion and right side portion of the seat vicinity portion 24 are attached with a pair of grip members 25, respectively. The rider seated on the seat 9 protrudes the rider's knees forward relative to the seat 9, pushes the knees against the grip members 25, respectively, and sandwiches the grip members 25 and the seat vicinity portion 24 interposed between the grip members 25**, by the knees, in order to stabilize the rider's driving posture. The seat vicinity portion

24 is smaller in size than the remaining portion of the battery case 20 in the rightward or leftward direction. This allows the rider to easily sandwich the seat vicinity portion 24 by the knees from the right and left sides. Thus, the rider's driving posture can be stabilized. Conversely, the remaining portion of the battery case 20, which excludes the seat vicinity portion 24, is relatively greater in size in the rightward or leftward direction. This makes it possible to achieve both a state in which the rider's driving posture can be stabilized and a state in which the size of the remaining portion in which the rider's knees do not easily reach can be increased to the greatest possible degree.

An air-intake duct 26 is coupled to the front surface of the battery case 20, while an air discharge duct 27 is coupled to the rear surface of the battery case 20. The air-intake duct 26 extends forward from the front surface of the battery case 20. The air discharge duct 27 extends downward from the upper portion of the rear surface of the battery case 20 and is coupled to the upper surface of the inverter case 19. During driving of the electric motorcycle 1, incoming ram air from the forward direction is taken into the air-intake duct 26, and sent to the interior of the battery case 20 via the air-intake duct 26. Also, air is discharged from the interior of the battery case 20 and sent to the interior of the inverter case 19 via the air discharge duct 27. In this way, the electric components accommodated in the battery case 20 and the electric components accommodated in the inverter case 19 can be cooled by air. As a result, the reliability of the operation of these electric components can be maintained. The left side portion and right side portion of the air discharge duct 27 are covered with a pair of grip members 25, respectively. This allows the rider to push the rider's thighs against the grip members 25 and the air discharge duct 27 disposed between the grip members 25. Thus, the rider's driving posture can be stabilized by utilizing the air discharge duct 27.

The electric motorcycle 1 includes a charging connector 30 to charge the battery 22. The charging connector 30 has a charging port 31 (see FIGS. 2 to 5) which is detachably attached to an outside connector 92 connected to an outside electric power supply 91. With the outside connector 92 connected to the charging connector 30, electric power can be supplied from the outside electric power supply 91 to the battery 22 to charge the battery 22. The battery 22 discharges the electric power stored therein in this way to supply it to the electric motor 5.

As will be described in detail later, the charging port 31 (see FIGS. 2 to 5) is positioned above the battery case 20 and forward relative to the seat 9 and faces rearward. Since the charging port 31 faces rearward, it is not necessary to raise the outside connector 92 to a high position even though the charging port 31 is positioned above the battery case 20. Therefore, a charging operation can be easily carried out. Since the charging port 31 faces rearward, it becomes possible to prevent ingress of rain water into the charging port 31 during the charging operation. Since the charging port 31 is positioned above the battery case 20 and forward relative to the seat 9, the charging port 31 faces the rider in the forward or rearward direction with the rider seated on the seat 9 properly. For this reason, if the charging port 31 is exposed, the rider can easily see this. This makes it easier to prevent a situation in which the rider starts the electric motorcycle 1 with the charging port 31 exposed.

Figure 2:
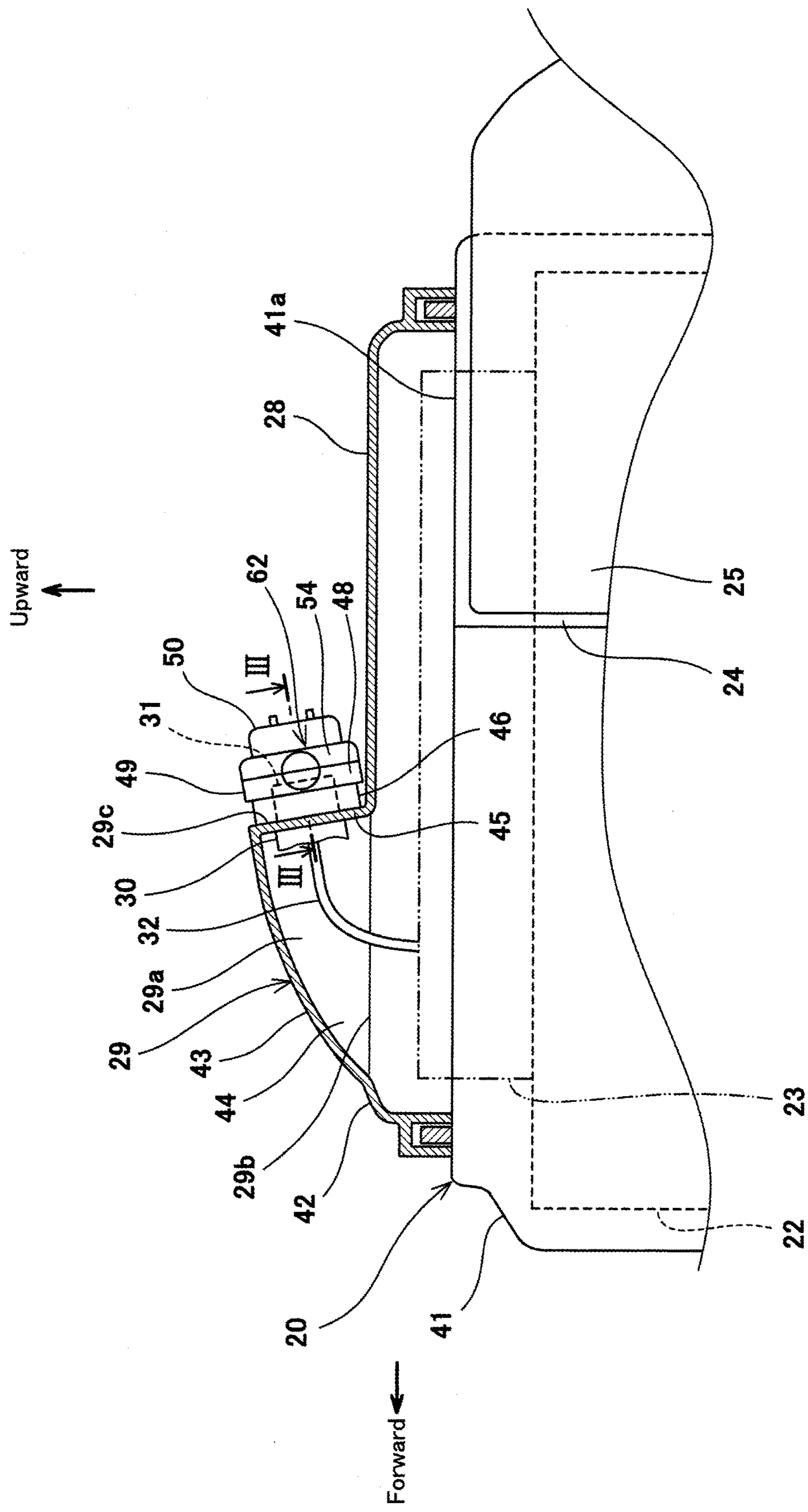
FIG. 2 is a cross-sectional view of a charging connector of FIG. 1, when viewed from above.

FIG. 2 is a perspective view of the upper portion of the battery case 20 of FIG. 1. As shown in FIG. 2, the charging connector 30 of the present embodiment is mounted to the upper portion of the battery case 20. The battery case 20 has a protruding section 29 protruding upward from an upper wall 28. The charging connector 30 is contained in the protruding section 29. The charging port 31 is provided at a rear side of the protruding section 29.

In the present embodiment, the battery case 20 includes a box-like case body 41 having an opening 41*a* on its upper surface and a lid member 42 covering the case body 41 from above. Although FIG. 2 shows the external appearance of a region (most of which is the case body 41) of the battery case 20 which is below the opening 41*a* and the cross-section of a region (most of which is the lid member 42) of the battery case 20 which is above the opening 41*a*. The seat vicinity portion 24 is provided in the case body 41. The upper wall of the lid member 42 constitutes the upper wall 28 of the battery case 20, while the protruding section 29 is provided in the lid member 42. The electric components 23 are mounted to the upper surface of the battery 22 and connected to the battery 22. When the lid member 42 is detached from the case body 41, the electric components 23 are accessible through the opening of the case body 41, and maintenance work of the electric components 23 can be carried out.

The protruding section 29 includes an upper protruding wall 43, a pair of side protruding walls 44, and a rear protruding wall 45. In FIG. 2, the inner surface of the right side protruding wall 44 of the two side protruding walls 44 is shown. The upper protruding wall 43 extends upward and rearward from the front edge of the upper wall 28 of the battery case 20. The upper protruding wall 43 extends rearward such that it is curved upward (center of the curvature radius of the upper protruding wall 43 is positioned rearward relative to and below the upper protruding wall 43). The pair of side protruding walls 44 extend vertically upward from the upper wall 28 of the battery case 20 and are continuous with the left edge and right edge of the upper protruding wall 43, respectively. The rear protruding wall 45 extends downward from the front edge of the upper protruding wall 43 and is continuous with the upper wall 28 of the battery case 20. The upper protruding wall 43 connects the right and left upper edges of the side protruding walls 44. The rear protruding wall 45 connects the right and left rear edges of the side protruding walls 44.

The protruding section 29 has an inner space 29*a* surrounded by the inner surfaces of the walls 43 to 45 constituting the protruding section 29. The inner space 29*a* is in communication with the inner space of the battery case 20 via an opening 29*b* formed in the inner lower portion of the protruding section 29. In the present embodiment, the opening 29*b* extends along the lower edge of the inner surface of the upper protruding wall 43, the lower edges of the inner surfaces of the side protruding walls 44, and the lower edge of the inner surface of the rear protruding wall 45, and has a rectangular shape when viewed from above.

The outer rear surface of the rear protruding wall 45 constitutes a rear surface 29*c* of the protruding section 29. An attachment 46 is attached on the rear surface 29*c*. The charging connector 30 is fastened to the attachment 46 with the charging port 31 facing rearward. In this way, the charging port 31 is attached to the rear surface 29*c* via the attachment 46.

The attachment 46 includes a mounting section 47 (see FIG. 3) seated on the rear surface 29*c* and a peripheral wall 48 protruding rearward from the outer edge of the mounting section 47. The charging connector 30 has a cylindrical shape and penetrates the mounting section 47 of the attachment 46 and the rear protruding wall 45 of the protruding section 29. The front end portion of the charging connector 30 is provided with a charging wire 32. The charging wire

32 is connected to the battery 22 via a charging relay. The charging relay is one of the electric components 23 mounted on the battery 22. The charging wire 32 extends from the charging connector 30 into the interior of the lid member 42 (interior of the battery case 20) through the inner space 29*a* and the opening 29*b* of the protruding section 29. Since the charging connector 30 is attached to the protruding section 29 in this way, the charging wire 32 can be laid out compactly. In addition, since the entire charging wire 32 is accommodated in the battery case 20, the charging wire 32 can be protected by the battery case 20.

The charging port 31 is provided in the front end portion of the charging connector 30 and positioned forward relative to the mounting section 47. The charging port 31 is surrounded by the peripheral wall 48. This allows the upper portion of the peripheral wall 48 to serve as an eave 49 extending rearward above the charging port. In contrast, in the present embodiment, the rear surface 29*c* is a flat surface and extends downward from the front edge of the upper protruding wall 43 such that it is inclined slightly rearward. Because of this, the normal line of the rear surface 29*c* extends rearward such that it is inclined slightly upward. The charging connector 30 has a cylindrical shape and is placed such that its axis is oriented in the normal line direction of the rear surface 29*c*. Because of the above structure, the charging port 31 facing rearward is inclined slightly upward, to be precise.

Since the charging port 31 is inclined slightly upward, the outside connector 92 (see FIG. 1) is easily inserted into the charging port 31, and thus a charging operation can be easily carried out. Since the eave 49 is provided above the charging port 31, it becomes possible to prevent ingress of foreign material such as rain water into the charging port 31 from above, even though the charging port 31 is inclined upward.

The rear protruding wall 45 is positioned forward relative to the seat vicinity portion 24 and the grip members 25. In the present embodiment, the rear protruding wall 45 is positioned forward relative to the center of the battery case 20 in the forward and rearward direction. The seat vicinity portion 24 and the grip members 25 are positioned rearward relative to the center of the battery case 20 in the forward and rearward direction. In this way, the charging port 31 faces rearward in the upper portion of the battery case 20 and is positioned forward relative to the grip members 25. Therefore, the charging port 31 is easily seen by the rider straddling the electric motorcycle 1 and does not interfere with the rider straddling the electric motorcycle 1, which is an advantage.

A charging cover 50 is detachably attached to the attachment 46 from the rear. During driving, the charging cover 50 attached to the attachment 46 can protect the charging connector 30 from outside foreign material. In addition, the presence/absence of the charging cover 50 is easily seen by the rider straddling the electric motorcycle 1. This makes it possible to prevent a situation in which the rider starts the electric motorcycle 1 in a state in which the charging port 31 is exposed.

Figure 3:
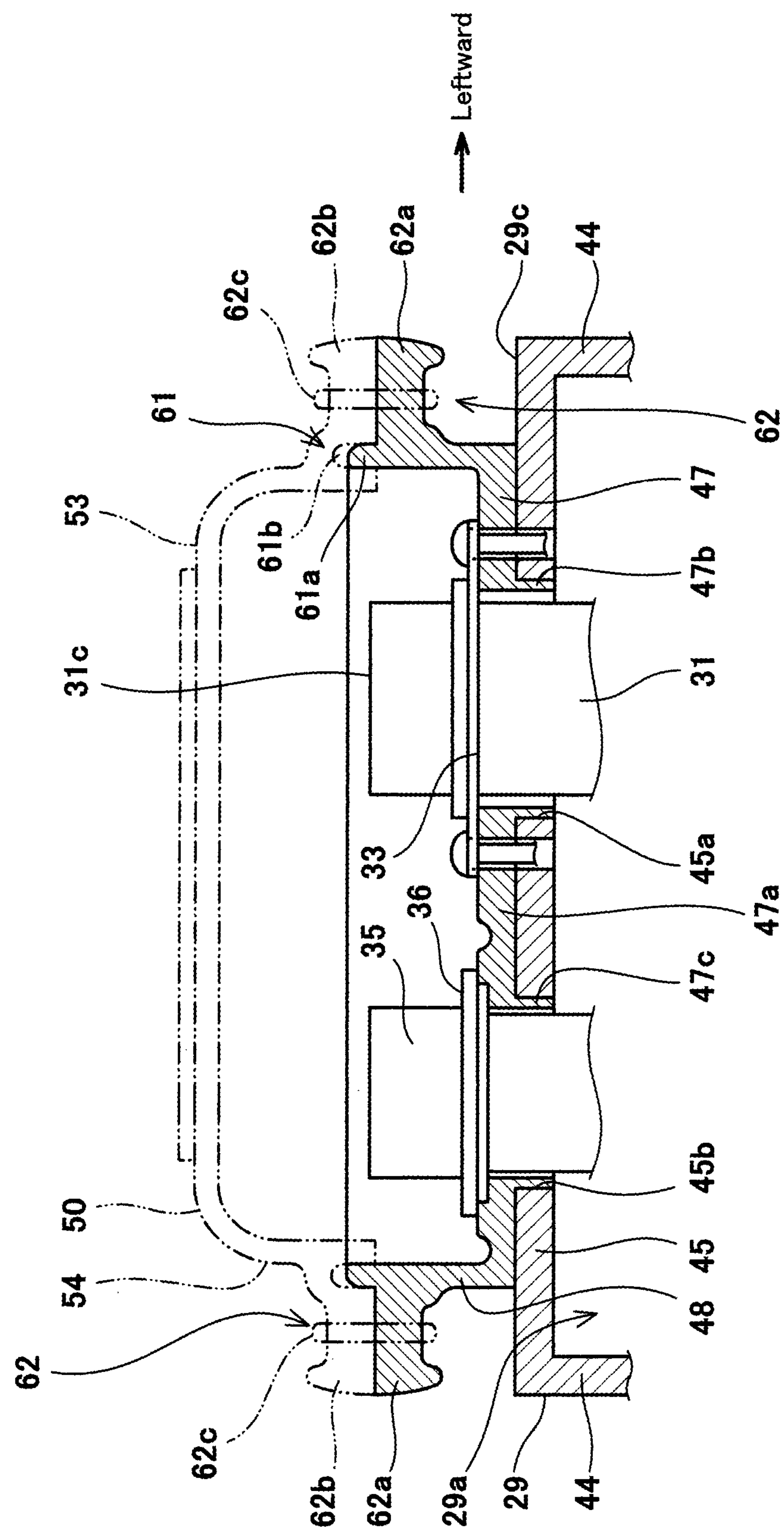
FIG. 3 is a cross-sectional view taken along III-III of FIG. 2.
Figure 4:
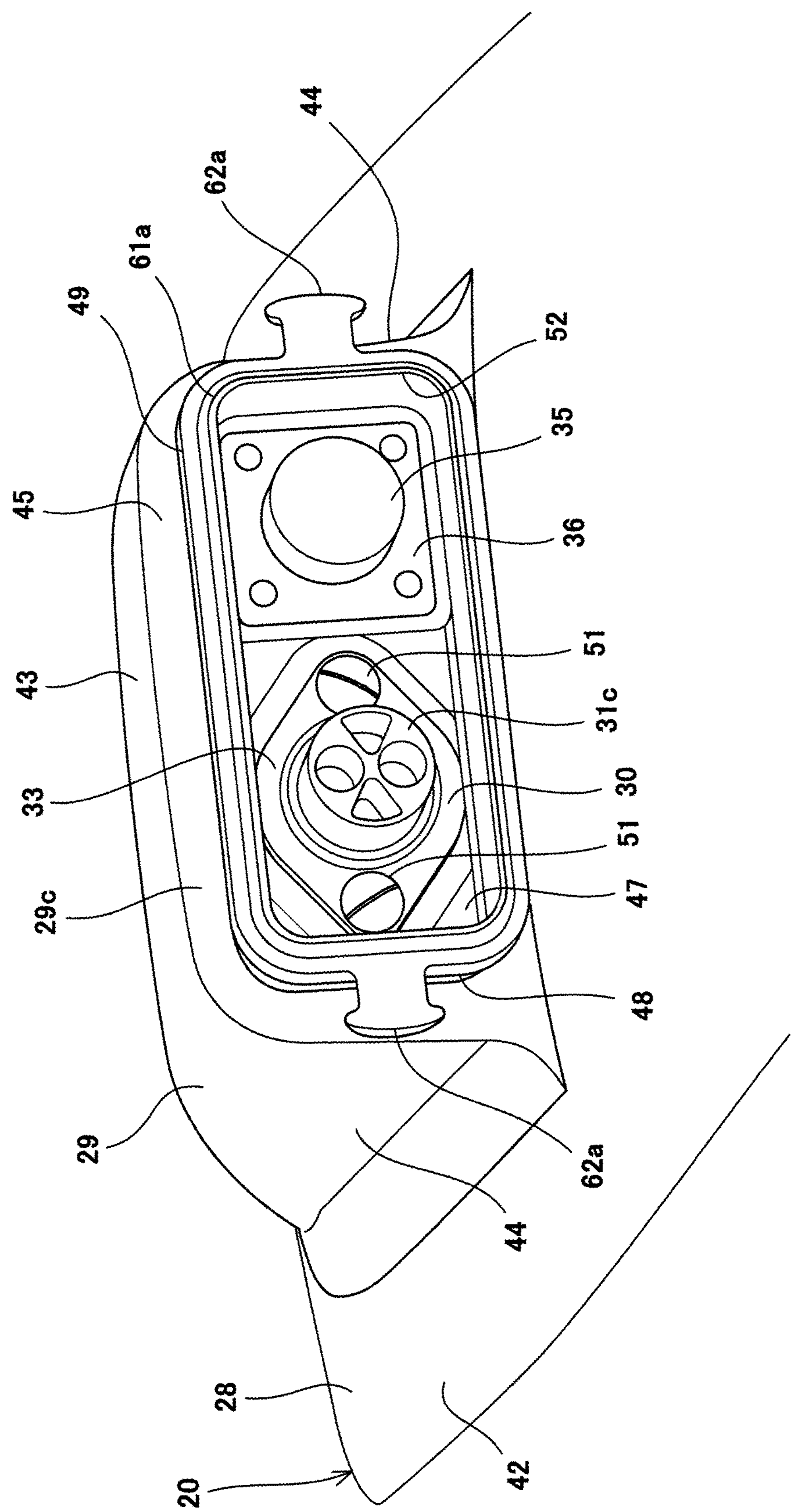
FIG. 4 is a perspective view of the upper portion of a battery case with a charging cover detached.

FIG. 3 is a cross-sectional view taken along III-III of FIG. 2. FIG. 4 is a perspective view of the upper portion of the battery case 20 with the charging cover 50 detached. As shown in FIGS. 3 and 4, a current sensor 35 is fastened to the attachment 46 such that the current sensor 35 is adjacent to the charging connector 30. The charging connector 30 and the current sensor 35 are arranged side by side along a rightward or leftward direction. Thus, the charging connector 30 is integrated with the current sensor 35. The width (dimension along a rightward or leftward direction) of the charging connector 30 equipped with the current sensor 35 is set greater than its height (vertical dimension). In correspondence with this, the attachment 46 and the rear protruding wall 45 are elongated in a rightward or leftward direction. Thus, the charging connector 30 and the members used to attach the charging connector 30 can be reduced in height. Therefore, even when the charging port 31 is positioned forward relative to the grip members 25, the protruding section 29 and the charging connector 30 do not interfere with the rider tilted forward during driving.

As shown in FIG. 3, the mounting section 47 of the attachment 46 includes a base plate 47*a* having a seat surface seated on the rear surface 29*c* of the protruding section 29, and a first fitting portion 47*b* and a second fitting portion 47*c* which protrude from the seat surface. The two fitting portions 47*b*, 47*c* are arranged side by side in the rightward or leftward direction and have a cylindrical shape. The rear protruding wall 45 has circular openings 45*a*, 45*b* arranged side by side in the rightward or leftward direction. When the attachment 46 is attached to the protruding section 29, the two fitting portions 47*b*, 47*c* are inserted into the circular openings 45*a*, 45*b*, respectively. This allows the base plate 47*a* to be positioned with respect to the protruding section 29.

The charging connector 30 is inserted into the inner peripheral side of the first fitting portion 47*b*. The charging connector 30 has a flange 33 in an intermediate portion in its axial direction. The flange 33 is butted with the base plate 47*a*. By bolts 51 inserted through the flange 33, the attachment 46, and the rear protruding wall 45, the charging connector 30 is fastened to the attachment 46 and the protruding section 29, and at the same time, the attachment 46 is fastened to the protruding section 29. The current sensor 35 is inserted into the inner peripheral side of the second fitting portion 47*b*. Like the flange 33 of the charging connector 30, the current sensor 35 has a flange 36 for fastening. The current sensor 35 is surrounded by the peripheral wall 48 together with the charging connector 30. This makes it possible to protect the current sensor 35 from foreign material from the outside (especially from above) as well as the charging connector 30.

As shown in FIG. 4, the attachment 46 has in its front end portion a rectangular opening 52 surrounded by the front edge of the peripheral wall 48. In the charging operation, an operator inserts the outside connector 92 (see FIG. 1) into the inner peripheral side of the peripheral wall 48 via the opening 52, and attaches the outside connector 92 to the charging port 31. The charging cover 50 (see FIGS. 2, 3, and 5) is attached to close the opening 52.

Figure 5:
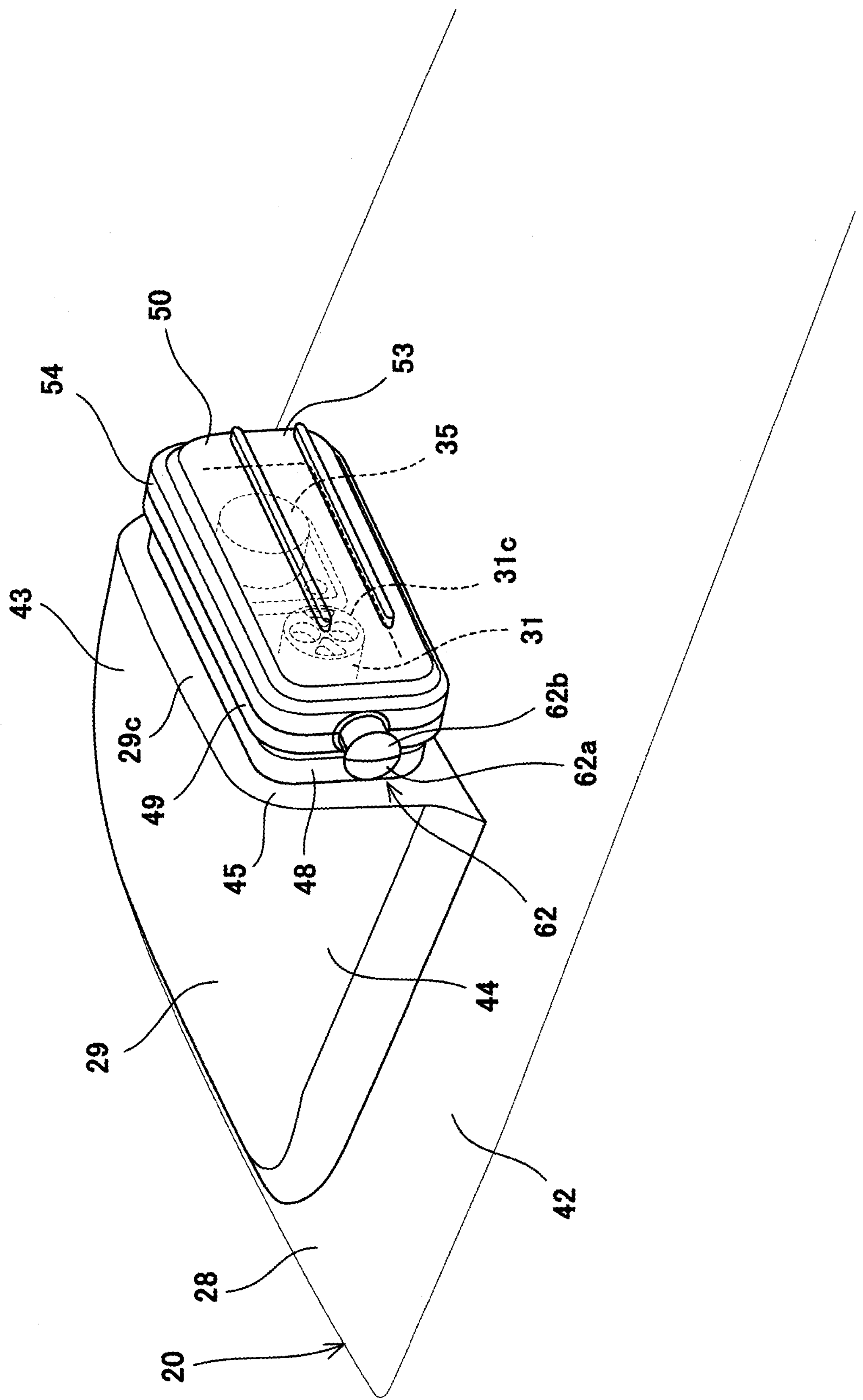
FIG. 5 is a perspective view of the upper portion of the battery case with the charging cover attached.

FIG. 5 is a perspective view of the upper portion of the battery case 20 with the charging cover 50 attached. As shown in FIGS. 3 and 5, the charging cover 50 has a rear wall 53 and a peripheral wall 54 protruding forward from the outer edge of the rear wall 53. The peripheral wall 54 of the charging cover 50 is butted with the peripheral wall 48 of the attachment 46. In this way, the opening 52 of the attachment 46 is closed by the charging cover 50.

As shown in FIG. 3, to fasten the charging cover 50 to the attachment 46, the attachment 48 and the charging cover 50 are provided with joint mechanisms 61, 62. The first joint mechanism 61 includes a rib 61*a* provided at one of the rear end portions of the peripheral wall 48 of the attachment 46 and the front end portion of the peripheral wall 54 of the charging cover 50, and a groove 61*b* which is provided in the other rear end portion of the peripheral wall 48 of the attachment 46 and the front end portion of the peripheral wall 54 and engages with the rib 61*a*. Although in the example of FIG. 3, the rib 61*a* is provided at the attachment and the groove 61*b* is provided in the charging cover 50, this may be reversed. When the rib 61*a* is formed to surround the entire periphery of the opening 52, a labyrinth structure surrounding the entire opening 52 can be formed by engaging the rib 61*a* with the groove 61*b*. This makes it possible to prevent ingress of foreign material from the outside into the inner side of the peripheral wall 48 of the attachment 46, with the charging cover 50 attached to the attachment 46. The second joint mechanism 62 includes a rod-like portion 62*a* protruding from the peripheral wall 48 of the attachment 46, and a rod-like portion 62*b* protruding from the peripheral wall 54 of the charging cover 50. With the charging cover 50 attached to the attachment 46, the rod-like portion 62*a* of the attachment 46 and the rod-like portion 62*b* of the charging cover 50 are in contact with each other. The tip end portions of the rod-like portions 62*a*, 62*b* are formed to swell. By providing rubber rings 62*c* around the outer peripheral surfaces of the intermediate portions of the two rod-like portions 62*a*, 62*b*, the state in which the two rod-like portions 62*a*, 62*b* are in contact with each other can be maintained. By providing two pairs of the two rod-like portions 62*a*, 62*b* at a right side and a left side, respectively, such that they are apart from each other, the charging cover 50 can be firmly attached to the charging cover 50 efficiently with few pairs of two rod-like portions 62*a*, 62*b*.

Figure 6:
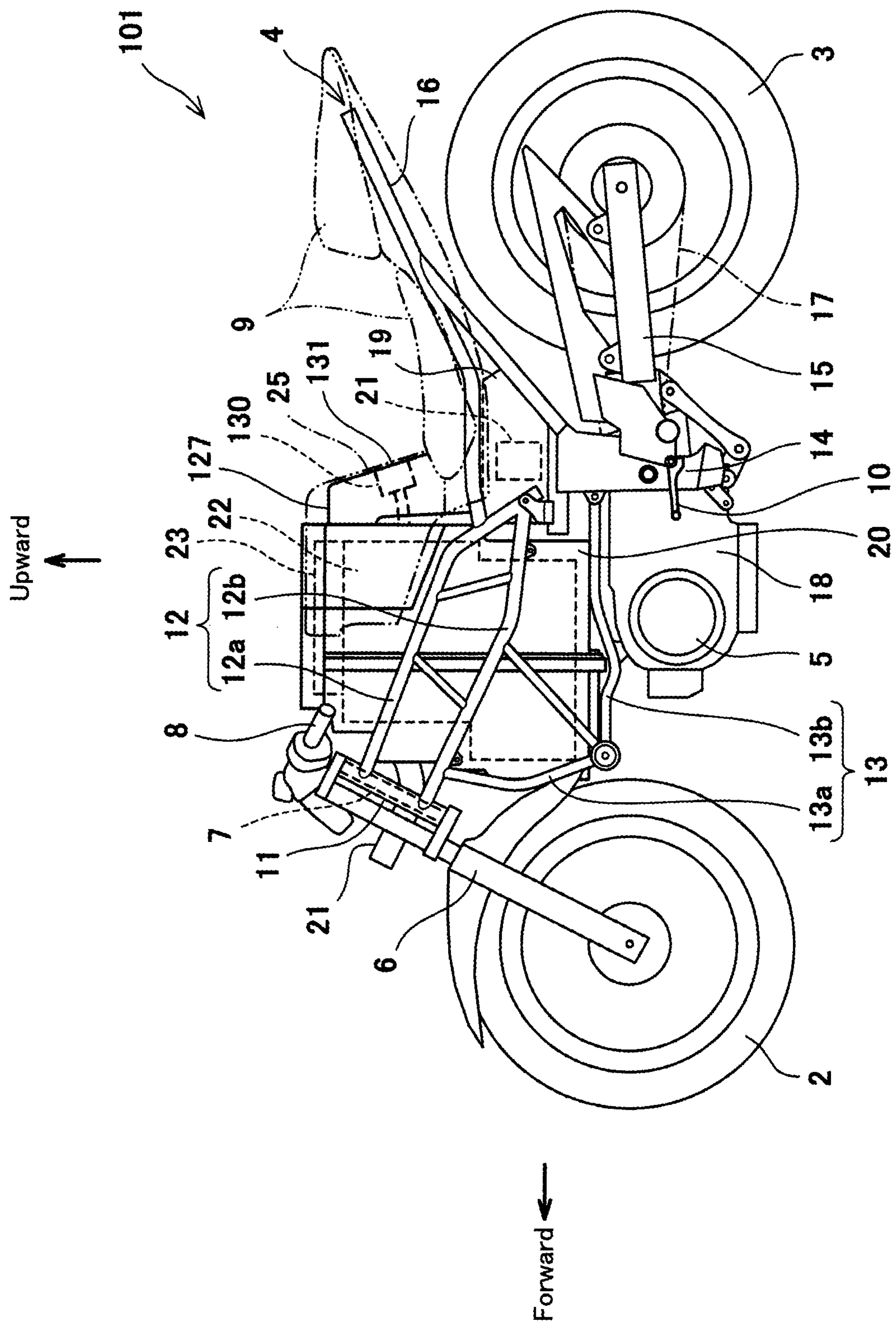
FIG. 6 is a left side view of an electric motorcycle which is an exemplary straddle electric vehicle according to Embodiment 2 of the present invention.
Figure 7:
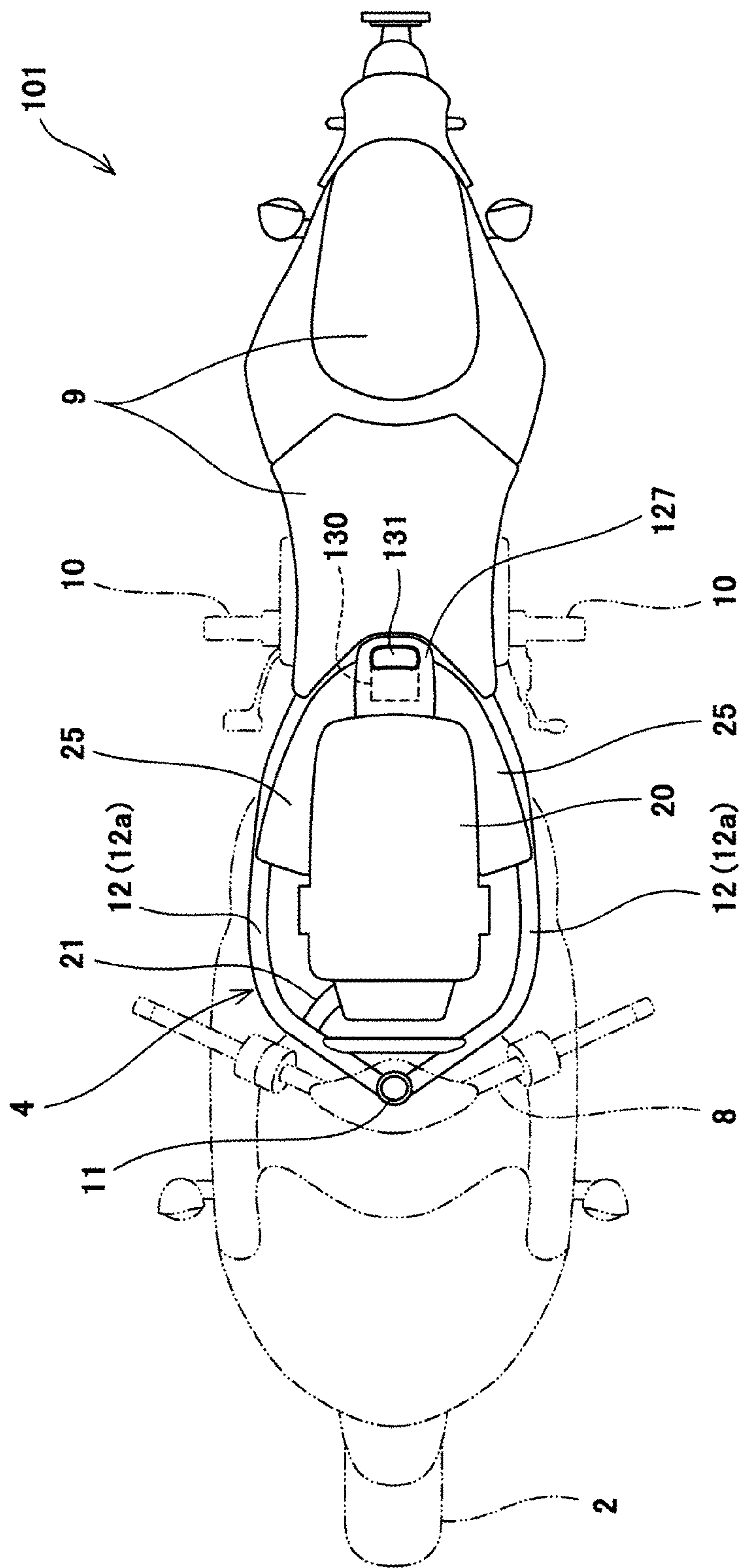
FIG. 7 is a plan view of the electric motorcycle of FIG. 6.

FIG. 6 is a left side view of an electric motorcycle 101 which is an exemplary straddle electric vehicle according to Embodiment 2 of the present invention. FIG. 7 is a plan view of the electric motorcycle 101 of FIG. 6. Hereinafter, differences between Embodiment 2 and the above described embodiment will be mainly described.

As shown in FIG. 6, an air discharge duct 127 is connected to the upper portion of the rear surface of the battery case 20. As in Embodiment 1, the air discharge duct 127 guides the air from inside the battery case 20 to the inverter case 19. In the present embodiment, a charging connector 130 is contained in the air discharge duct 127, and a charging port 131 is provided to conform in shape to the inner surface of the rear wall of the air discharge duct 127. The seat 9 is placed rearward relative to the air discharge duct 127. In the present embodiment, the charging connector 130 is attached to the upper portion of the battery case 20, and the charging port 131 is positioned forward relative to the seat 9 so as to face rearward.

Like the rear protruding wall 45 (see FIG. 2) of Embodiment 1, the rear wall of the air discharge duct 127 is slightly inclined rearward from its upper side toward its lower side. Because of the above structure, the charging port 131 facing rearward is inclined slightly upward. Therefore, as in Embodiment 1, the outside connector 92 (see FIG. 1) is easily inserted into the charging port 131, and thus a charging operation can be easily carried out.

As shown in FIG. 7, the rear upper portion of the battery case 20 is provided with a pair of right and left grip members 25. The pair of right and left grip members 25 are placed forward relative to the seat 9, and cover the right and left side walls of the air discharge duct 127, the upper portion of the rear wall of the battery case 20, and the upper portions of the right and left side walls of the battery case 20. The rider seated on the seat 9 sandwiches the grip members 25 with the knees, and thus, the rider's driving posture can be stabilized.

The upper portion of the battery case 20 is positioned above the main frames 12, while the air discharge duct 127 reaches the inverter case 19 (see FIG. 6) located below the seat 9. In the present embodiment, the rear wall of the air discharge duct 127 is not covered with the grip members 25. Because of this structure, the rear wall of the air discharge duct 127 includes a portion which is located above the seat 9 and is not covered with the grip members 25 (exposed), and a portion which underlies and is covered with the seat 9. The charging port 131 is provided in the exposed portion. Therefore, the charging port 131 is located between the pair of right and left grip members 25 and close to the seat 9 in the forward or rearward direction. Since the charging port 131 is positioned close to the seat 9 and close to a location of the feet of the rider straddling the electric motorcycle 1, the rider is less likely to start the electric motorcycle 1 by mistake.

Although the electric motorcycle has been exemplarily described in the embodiments of the present invention, the present invention is applicable to other straddle vehicles such as an all terrain vehicle (ATV), or a three-wheeled vehicle. Although the vehicle which does not include an internal combustion engine and drives only by the driving power generated by the electric motor is exemplarily described as the electric vehicle, the present invention is also applicable to a hybrid vehicle including the internal combustion engine in addition to the electric motor.

Numerous modifications and alternative embodiments of the present invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

INDUSTRIAL APPLICABILITY

The present invention has advantages in that it becomes possible to prevent a situation in which a rider starts a straddle electric vehicle in a state in which a charging connector is exposed, or rain water or the like enters a charging port of the charging connector, and therefore is effectively applied to a straddle electric vehicle including the charging connector.

The invention claimed is:

1. A straddle electric vehicle which drives by driving power generated by an electric motor, comprising:

a charging connector configured to be connected to a detachable outside connector that connects to an outside electric power supply;

a battery configured to be charged by electric power supplied from the outside electric power supply, with the detachable outside connector attached to the charging connector, that discharges the electric power stored therein to supply the electric power to the electric motor;

a seat on which a passenger is seated;

a battery case disposed between the seat and a front wheel and configured to accommodate the battery; and a handle which is operated to steer the front wheel, wherein the charging connector is attached to an upper portion of the battery case comprising a protruding section having an upper protruding wall extending rearward, a center of a curvature radius of the upper protruding wall positioned rearward relative to and below the upper protruding wall, and a charging port of the charging connector is positioned forward relative to and above the seat on a surface of the battery case, and located above the battery case and rearward of the handle.

2. The straddle electric vehicle according to claim 1, wherein the charging connector is accommodated in the protruding section, the protruding section further includes a rear side, and the charging port is provided in the rear side of the protruding section.

3. The straddle electric vehicle according to claim 1, wherein the charging port is inclined upward.

4. The straddle electric vehicle according to claim 1, wherein the battery case has in a rear upper portion a pair of grip members, and wherein the charging port is positioned forward relative to the grip members.

5. The straddle electric vehicle according to claim 1, wherein the battery case has in a rear upper portion a pair of right and left grip members, and wherein the charging port is positioned between the right and left grip members.

6. The straddle electric vehicle according to claim 1, wherein a width of the charging connector is set greater than a height of the charging connector.

7. The straddle electric vehicle according to claim 3, comprising:

an eave portion provided above the charging port so as to extend rearward.

8. The straddle electric vehicle according to claim 1, wherein the charging port is provided in a rear wall of the battery case.

9. The straddle electric vehicle according to claim 1, comprising:

a charging cover detachably attached to the charging port.

* * * * *